Aug. 2, 1949.　　　K. K. PROBST　　　2,477,822
VEHICLE SUSPENSION

Filed Feb. 7, 1944　　　4 Sheets-Sheet 1

INVENTOR.
Karl K. Probst.
BY
Harness, Dickey & Pierce.
ATTORNEYS

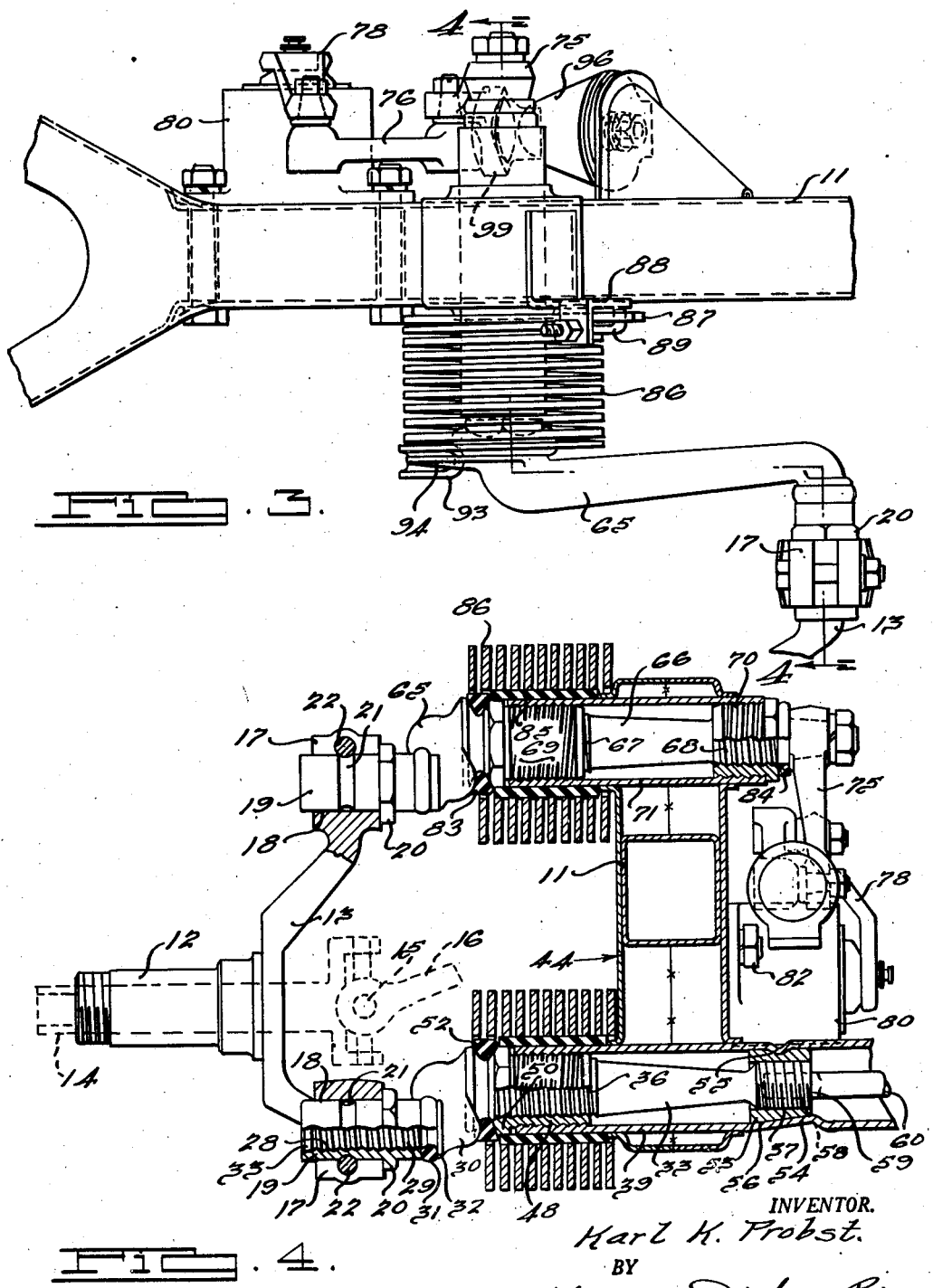

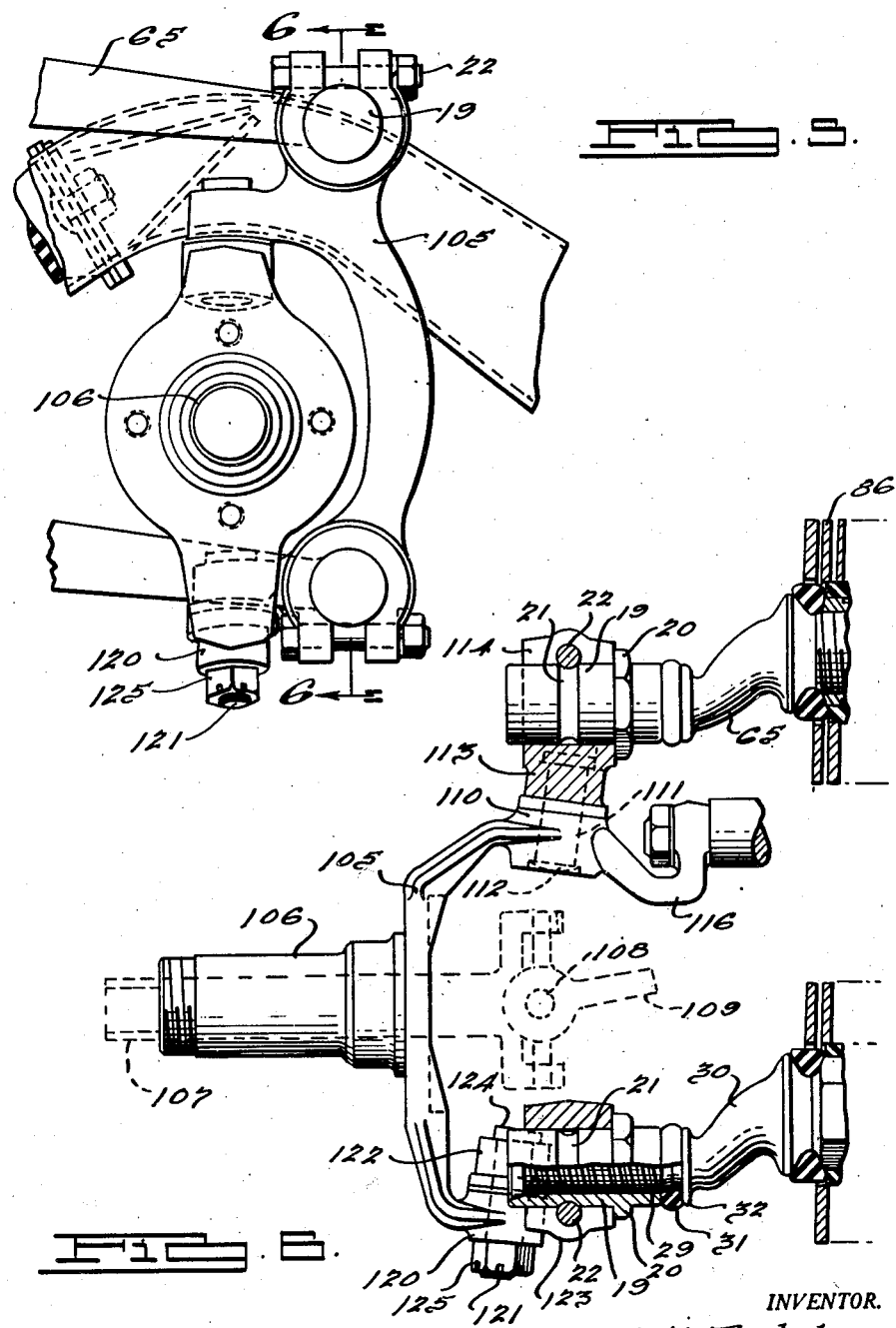

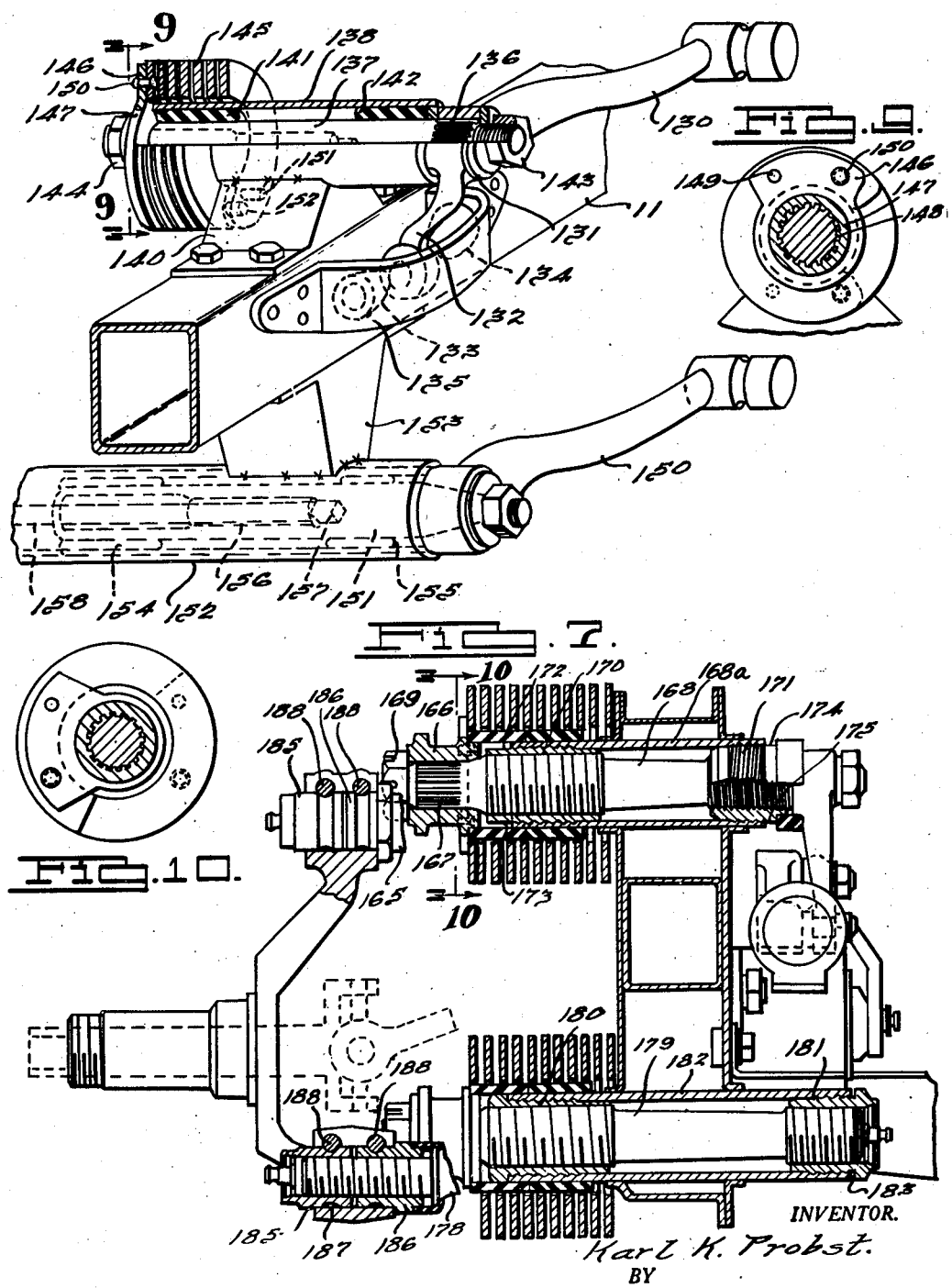

Patented Aug. 2, 1949

2,477,822

UNITED STATES PATENT OFFICE 2,477,822

VEHICLE SUSPENSION

Karl K. Probst, Highland Park, Mich., assignor to Henry J. Kaiser Company, Oakland, Calif., a corporation of Nevada Application February 7, 1944, Serial No. 521,331

5 Claims. (Cl. 280—124)

1

The invention relates to motor vehicles, and it has particular relation to individual wheel suspensions.

An object of the present invention is to provide an improved wheel suspension having extremely comfortable riding qualities while still obtaining a desired degree of stability.

Another object of the invention is to provide an improved type of individual wheel suspension which can be manufactured and assembled inexpensively, and which is very durable and satisfactory in operation.

Another object of the invention is to provide an improved type of wheel suspension having an improved type of torsional spring acting to control relative movement of the parts in the suspension during use of the vehicle.

Another object of the invention is to provide an improved wheel suspension in a motor vehicle wherein two suspensions at opposite sides of the vehicle frame are connected by a stabilizing or sway bar tending to equalize movements of opposite sides of the frame.

Another object of the invention is to provide an improved type of wheel suspension mounting which allows, in an improved manner, torsional movement of the suspension during upward and downward movement of the vehicle frame, torsional movement of the wheel spindle and brake during brake application and side thrust applied from the wheels.

Another object of the invention is to provide a duplicate front and rear wheel suspension to attain manufacturing and servicing advantages.

Another object of the invention is to provide a design of suspension which can be used with either a front or rear engine and with front or both front and rear wheel drive.

Another object of the invention is to provide an improved type of crank arm bearing which may be readily adjusted for wear.

Other objects of the invention will become apparent from the following description, from the drawings relating thereto, and from the claims hereinafter set forth.

For a better understanding of the invention reference may be had to the drawings wherein:

Fig. 3 is a plan view of the suspension shown by Fig. 2;

Fig. 4 is a cross-sectional view on a larger scale

Figure 1:
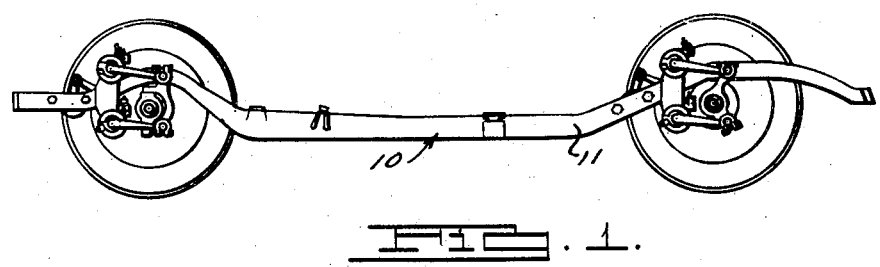
Fig. 1 is a side elevational view of a vehicle frame having wheel suspensions constructed to one form of the invention.

2 taken substantially along the line 4—4 of Fig. 3;

Fig. 5 illustrates one of the front wheel suspensions shown in Fig. 1;

Fig. 6 is a cross-sectional view taken substantially along the line 6—6 of Fig. 5;

Fig. 7 is an elevational view, partly in section, illustrating another form of individual wheel suspension constructed according to the invention;

Fig. 8 illustrates a suspension constructed according to another form of the invention;

Fig. 9 is a cross-sectional view taken substantially along the line 9—9 of Fig. 7; and Fig. 10 is a cross-sectional view taken substantially along line 10—10 of Fig. 8.

Referring to Figures 1, 2, 3 and 4, the vehicle frame is illustrated at 10 and may comprise opposite longitudinal side members 11 of box type as shown. While the individual suspensions on the four wheels are generally the same as seen in Fig. 1, the two at the left end of the frame are connected to dirigible wheels, or wheels which may be steered, while the wheels at the right end of the frame are of non-steering type. The wheel suspension for the steerable wheels may correspond to the particular type shown in Figs. 5 and 6, while the suspension for the rear wheels may correspond to that shown in Figs. 2, 3 and 4.

Referring now particularly to Fig. 4, the hub upon which the rear wheel may be mounted is indicated at 12 and is secured to a wheel mounting member 13. This hub is adapted to receive a driving axle or shaft 14 which in turn is adapted to be drivingly connected to the wheel in a manner well known in the art. The shaft 14 may be connected by means of a universal joint 15 to a drive shaft 16 leading in turn to the power transmission of the vehicle.

Figure 2:
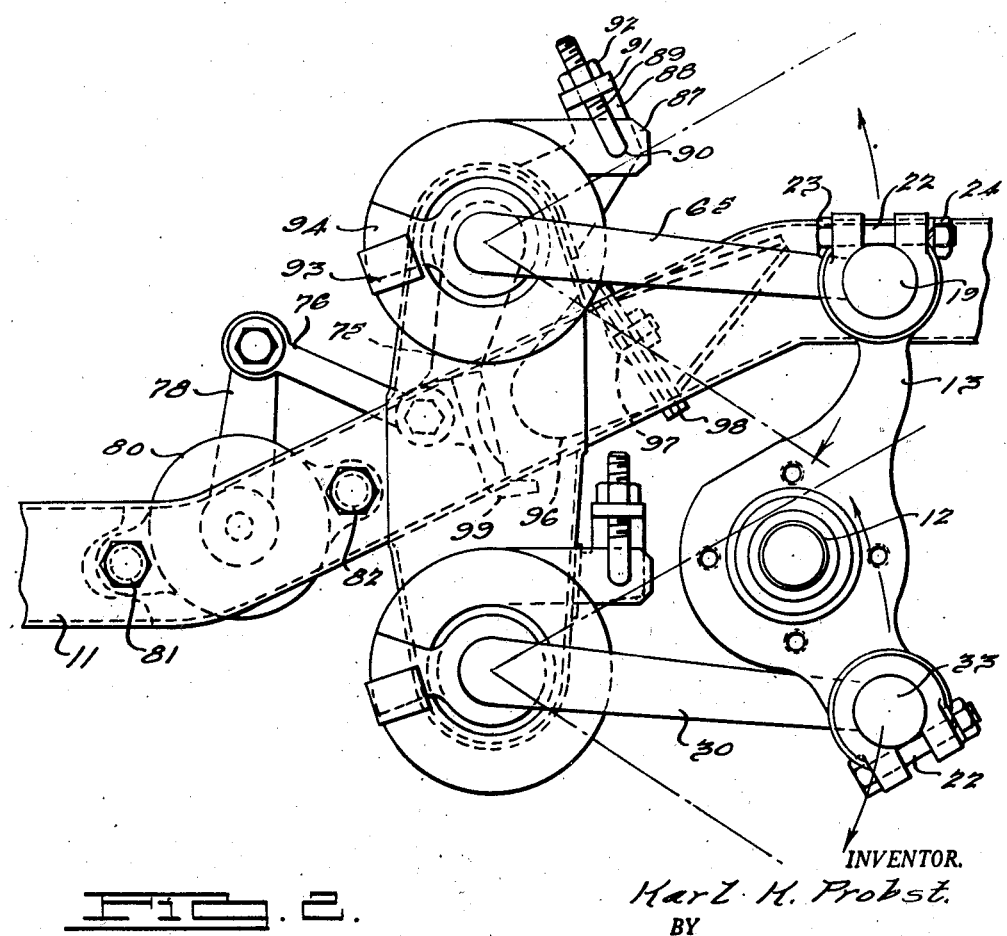
Fig. 2 is an enlarged side view of one of the rear wheel suspensions shown in Fig. 1.

At its lower end, the wheel mounting member 13 is bifurcated as indicated at 17, and the bifurcated portion has an opening 18 which receives a cylindrical bushing 19 having a hexagonal head 20 at one end. The bushing is held against longitudinal displacement in the opening 18 by means of an annular groove 21 in the bushing and a bolt 22 projecting through the ends of the bifurcated portion and partially engaging the groove. This bolt, as best shown in Fig. 2, has a head 23 on one end and a nut 24 on the other end, so that when the nut is tightened, the bushing is clampingly locked against rotation in the opening. The bushing is internally threaded as indicated at 28 and a threaded trunnion 29 projecting laterally from one end of a lower arm 30 is threaded into the bushing so as to provide a threaded bearing. A rubber sealing ring 31 is provided at the end of the bushing 19 and between such end and a shoulder 32 on the arm 30 for preventing the escape of lubricant and preventing dirt from getting into the threaded bearing. At its opposite end, the bushing may be closed by means of a welch plug 33 and the plug may be provided with a suitable grease fitting (not shown) so that grease may be forced into the bearing. It will be evident that if the nut 24 is loosened, the bushing 20 may be turned so as to move the lower end of the wheel-mounting member along the threaded trunnion 29 thereby providing an adjustment for varying the camber of the wheels.

At its opposite end, the arm 30 has an integral trunnion extension 33 formed with two threaded portions 36 and 37 located in spaced relation and which are of different diameters. This extension 33 projects into a tubular element 39 which extends through and is rigidly connected, by welding, to a tubular upright element 44. The frame member 11 extends through the element 44 substantially midway between its ends and the two parts are rigidly connected by welding. The threaded portion 36 on the trunnion 33, has pivotal threaded bearing engagement with the internally-threaded surface of a bushing 48, and such bushing, in turn, has a threaded exterior threaded into the end of the tubular element or bearing sleeve 39 but with an opposite thread. Such external threads on the bushing 48 are of shallow or of obtuse character, and when the bushing is threaded into the tubular element the bushing forms or cuts threads in the inner surface of the element and becomes strongly locked against any accidental loosening. A rubber sealing ring 52 is provided at the outer end of the trunnion 33 for preventing dirt from getting into the tubular element and preventing lubricant from escaping. It might be mentioned here that lubricant may be injected into the threaded bearing at any suitable point and grease fittings may be provided for this purpose.

The smaller threaded end 37 on the trunnion 33 has pivotal threaded engagement with a bushing 53 which is fixed in axial position in the tubular element by indentation of the metal as indicated at 54 and 55. By inclining the surface of the tubular element as indicated at 54 and correspondingly inclining the bottom surface of the bushing 53, such bushing has better resistance to endwise movement, and hence lateral stability of the bearing is increased. The threaded end 37 of the trunnion has a socket 58, polygonal in shape, and this socket is adapted to receive a similarly shaped end 59 on a sway bar 60 extending to the opposite side of the vehicle for similar engagement with the trunnion on the lower arm of the opposite suspension. It is to be understood that the tubular element 39 extends across the frame of the vehicle and similarly co-operates with the trunnion on the lower arm of the suspension there so that the two trunnions on the two suspensions are connected by the bar 60. This bar acts to equalize the movements of both suspensions, and if one wheel moves vertically with respect to the frame, the tendency is to cause a similar relative movement at the opposite side, and hence tilting of the frame at one side or the other is counteracted by a similar movement at the opposite side of the frame.

At its upper end the wheel mounting member 13 is similarly connected to an upper arm 65 which has a trunnion 66 provided with right hand threaded portions 67 and 68 respectively threaded into bushings 69 and 70. These bushings have shallow external locking threads directed oppositely to their interior threads and are threaded into opposite ends of a tubular element or bearing sleeve 71 projecting through and fastened to the upper end of the frame element 44. One bushing is disposed at one end of the element and the other bushing at the opposite end and hexagonal heads are provided on both bushings so that they can be threaded into the element during which they form or cut their own threads in the inside surface of the latter.

Beyond the bushing 70 the trunnion 66 is connected to an arm 75, and this arm as shown by Fig. 2 is pivotally connected to a link 76. The link in turn is pivotally connected to a shock absorber arm 78 forming part of a shock absorber 80 which is fastened to the side frame member 11 by bolts 81 and 82. Rubber rings 83 and 84 at the ends of the bushings 69 and 70 serve to seal the threaded bearings in the manner previously described and grease fittings at suitable points may be used in order to lubricate such bearings.

Since the bushings 48, 69 and 70 have their external threads directed oppositely to their internal threads, it is apparent that thread wear may be taken up by turning each bushing a slight amount in either direction. A space may be provided between the hexagonal heads on the bushings 48 and 69 and the end of the tubular elements to permit further tightening, if desired, and a similar space might also be left between the head on bushing 70 and the end of the bushing. In assembling, the bushing 53 is inserted and fastened in place and then the bushings 48, 69 and 70 are threaded into the ends of the tubular elements. Then the trunnions are inserted by first passing the smaller threaded ends thereof through bushings 48 and 69 until both smaller threaded portions are ready to be threaded into the bushings 53 and 70. In the event the internal threads in the two bushings in either tubular element are not in proper continuity or do not match the threads on the two portions of the trunnion therein, it is only necessary to partly turn one bushing until threading of both threaded portions of the trunnion can start and then the trunnion may be turned until in the position illustrated. Any later turning of either bushing will adjust for thread wear.

For resiliently supporting the vehicle frame on the wheels, a torsion spring is employed which includes a rubber sleeve or ring 85 disposed on the tubular element 71 and a metal coil spring 86 encircling the rubber sleeve. The metal spring 86 which is formed from flat metal having its wider side disposed radially, has its inner end indicated at 87 in Fig. 2 connected to an arm 88 fastened to the frame element 44 by means of a threaded hook element 89. This element engages an aperture 90 in the end of the spring and extends through an opening in an offset portion 91 on the arm 88 and has a nut 92 outwardly of such offset portion. The outer end of the spring, as best shown by Figs. 2 and 3 terminates in a bent portion 93 which has hooking engagement with a shoulder or flange 94 formed on the arm 65. The weight of the frame tends to wind the spring and hence the spring torsionally resists downward movement of the frame. As the spring winds tighter, the rubber sleeve also acts as a torsion spring and resists tightening or winding of the spring and hence the metal coil and the rubber sleeve act jointly to take the load of the frame through torsioning of the spring and rubber. Preferably, the rubber sleeve is vulcanized to the tubular element 71.

The same type of torsion spring is provided for the lower arm and is connected to the arm 30 and frame and tubular element 39 in substantially the same way.

In addition to the shock absorber previously mentioned, a rubber buffer 96, shown best by Figs. 2 and 3, may be fastened as indicated at 97 to a plate 98 secured to the side element 11 of the frame. This buffer element is adapted to engage a projection 99 firmly connected to the arm 75. Upon predetermined downward movement of the frame with respect to the wheel, the buffer 96 will engage the element 99 and limit the movement.

Now referring to Figs. 5 and 6, the individual wheel suspension shown in these figures is substantially identical to that already described, with the exception that the wheels are mounted so that they may be turned for steering the vehicle. Instead of having a wheel-mounting member such as the member 13 shown in Fig. 1, a turnable wheel-mounting member 105 is provided which has a hub 106 adapted to receive a driving axle 107 in turn connectible with the wheel. This axle 107 may be connected to a universal joint, indicated at 108, and the latter in turn is connected to a driving shaft 109 extending to the power transmission of the vehicle. The wheel-mounting member 105 at its upper end has a boss 110 provided with a cylindrical opening 111, and this opening receives a pin 112 having heads at both ends. Such pin extends upwardly into an element 113 having a bifurcated end 114 adapted to co-operate with a bushing 19 in the same manner as described in connection with Fig. 1. A steering arm 116 is connected to the boss portion 110 on the member 105 and leads to steering mechanism, as will be readily understood.

At its lower end, the member 105 has a similar boss 120 which is apertured to receive a bolt 121 extending through an element 122 having a bifurcated portion 123 co-operating with the lower bushing 19. The bolt 121 has a head 124 on its upper end and a nut 125 on its lower end so as to hold the parts properly assembled. The pins 112 and 121 are aligned and act as a king pin so that the wheel may turn about the axis of the pin during steering.

It will be understood in connection with both individual suspensions, that is, the suspensions for the front wheel and the suspensions for the rear wheel, that brakes will be provided in the usual manner. The brake drums for such brakes may be secured to the wheel mounting members 13 and 105 according to well understood practice.

Fig. 7 shows a modified form of suspension which may be used for either the rear wheels or the front wheels. In this construction the upper arm is indicated at 130 and is in the form of a bell crank having an apertured boss 131 at the center of the two end portions and an end portion 132 which is adapted to engage oppositely disposed buffers 133 and 134 secured to a U-shaped bracket 135 in turn fastened to the frame element 11. The aperture in the boss portion 131 of the arm has internal splines which engage splines 136 on a pin 137 extending through a tubular element 138 so that when the arm swings, the pin turns with it. The tubular element 138 is welded to a saddle 140 in turn bolted to the frame member 11. Rubber sleeves 141 and 142 are provided between the inner surface of the element 138 and the pin 137, and the rubber preferably is vulcanized to both surfaces. Nuts 143 and 144 are provided on opposite threaded ends of the pin for holding the parts on the pin in assembled relation.

A coil spring 145 similar to the previous coil springs mentioned, is used in conjunction with the rubber sleeves 141 and 142 for taking torsional loads, and this spring extends around the tubular element 138. In this structure the outer end of the spring is fastened to a radially disposed, flat projection 146 on a hub 147 keyed as indicated at 148 to the pin 137 and held in place thereon by the nut 144. For fastening the end of the spring to the projection 146, a dowel or pin 149 and a rivet 150 project through both the projection and the spring end so that a substantial, circumferential length of the end convolution of the spring is firmly fixed against expansion or contraction during torsioning of the spring. Similarly, the other end of the spring is fastened to the side of saddle 140 by a dowel 151 and rivet 152. Fastening of the ends of the spring to the relatively movable parts in this manner insures greater stability for the end convolutions and holds them substantially concentric to the tubular element 138 and as a result the entire spring is held in concentric relation to the tubular element through torsioning movement of the spring. Cocking of the end convolutions is prevented, in other words, and the spring as an entirety remains substantially concentric to the axis of the pivotal arm action. It has been found that a spring so controlled at its ends, is more efficient and that it has greater torsional resistance and more uniformly distributed torsional action.

The lower arm of the suspension indicated at 150 is similarly connected to a pin 151 which projects into a tubular element 152. The latter extends across the frame and is connected to both side elements by being welded to parts 153 in turn fastened to the side members 11 of the frame. Within the sleeve 152, the pin 151 has a torsional rubber spring connected thereto and comprising the rubber sleeves 154 and 155, and these are similar to the sleeves 141 and 142 and are vulcanized to both the inner surface of the tube and to the outer surface of the pin. The inner portion of the pin has a central bore 156 terminating inwardly in a polygonal socket 157, and this socket is adapted to engage the polygonal end of a sway bar 158 extending across the frame of the vehicle and similarly connected to the lower pin of the opposite suspension. Hence the two opposed arms 150 are connected through the sway bar 158. It will be observed too that the tubular member 152 acts as a part of the frame, and this is true in connection with the transverse tubular element 39 in Figure 4.

The construction shown by Figure 8 is somewhat similar to that shown by Figure 4, but certain distinctions are present as will be apparent from the following description. In the structure shown by Fig. 8, instead of using suspension arms having integral trunnions, the trunnions and arms comprise separate parts. The upper arm, indicated at 165, has an apertured end 166 which has interior serrations engaging serrations 167 on a trunnion 168. This arm is held in serrated engagement with the trunnion by means of a nut 169 threaded onto a smaller threaded end on the trunnion and the nut engages the side of the apertured projection 166 on the arm. A slight taper may be provided in the serrated engagement to insure a rigid relation of parts when the nut 169 is tightened, or, in other words, as the apertured projection 166 is moved over the serrated portion of the trunnion, it moves over a slightly increasing diameter to insure a locked condition.

The trunnion 168 has threaded bearing engagement with bushings 170 and 171, which are substantially the same as bushings 69 and 70 previously described, excepting that the bushing 170, instead of having a hexagonal head may have diametrically opposite flats 172 and 173 while the bushing 171 has similar flats 174 and 175.

The lower arm on the suspension indicated at 178 is similarly connected to a lower trunnion 179 having threaded portions threaded into bushings 180 and 181. These bushings have ordinary hexagonal heads and in this structure, distinguishing again from Fig. 4, instead of having a tubular element extending across the frame and to the opposite suspension a short tubular element 182 is provided which is on the order of that above it and indicated at 168a. A space indicated at 183 may be left between the hexagonal head on bushing 181 and the end of the tube for adjustment purposes although this same space may be provided under the hexagonal head on the bushing 180 also, if desired. Similarly, the bushings 170 and 171 may be arranged with respect to the ends of the tubular element that either bushing may be turned in either direction for adjustment purposes. Since the external threads on all bushings are opposite to the interior threads, the turning of any bushing will adjust for thread wear. The external threads are of shallow, oblique character in order to obtain a lock with the tubular element, and in assembling the bushings with the tubular element, such shallow threads cut or form the interior threads in the tubular element and when the bushings are in place, as shown, they are locked against any accidental loosening, although, by using a wrench any one of the bushings may be turned in order to obtain wear compensating adjustment.

Another distinction between the structure shown by Fig. 8 and that shown by Fig. 4 is that instead of using one threaded bushing on the trunnion on the outer end of each arm, two separate bushings are used. With respect to the bushings on the lower arm, they are indicated at 185 and 186 and each of these bushings has an annular groove 187 in its external surface adapted to co-operate with a clamping bolt 188. Accordingly, two clamping bolts are provided for respectively clamping the two bushings in position. By loosening either bolt, its bushing may be turned so as to compensate for wear in the threaded bearing and by turning both bushings in one direction or the other, the camber angle of the wheel may be varied. A similar arrangement of bushings is provided between the upper arm 165 and the wheel supporting member.

In the use of rubber springs it may be mentioned generally that three movements must be allowed for, namely: the torsional movement of the suspension occurring during vertical movement of the frame, the torsional movement of the wheel spindle and brakes due to brake application, and the side thrust from the wheels applied to the trunnions or shafts when turning the vehicle, for instance.

In the structure shown by Figs. 1 to 6, inclusive, the torsional movements of the suspension caused by vertical movement of the frame and the torsional movement on the wheel spindle and brakes due to brake application are accommodated by the combined rubber and coil spring. In this case, no rubber is provided for taking the side thrust from the wheels, but such side thrust is taken through the inherent resiliency of the parts.

In the construction shown by Fig. 7 the torsional movement mentioned is taken by the rubber and springs, while the side thrust is resiliently taken through the rubber sleeves around the trunnions.

In connection with the combined metal spring and the rubber spring, that is, where rubber torsion elements and metal coil springs are used in combination, several advantages may be noted: In the first place, an extremely light weight structure may be used. Secondly, by timing the neutral load position of the rubber torsional bushings to about fifty per cent of the normal coil spring deflection, it is possible to obtain a variable rate so that the load and rate are approximately proportional. Again, the failure of either the rubber or coil spring does not render the suspension inoperative; additionally, the design permits either front or four-wheel drive, or both, and provides engine clearance for front or rear engines. It might be mentioned, especially in connection with the second advantage, that when the coil spring has deflected fifty per cent of the normal deflection to be obtained in operation of the vehicle, the rubber torsional spring will be in a neutral position and hence the metal spring is under fifty per cent deflection when the rubber is neutral. Considering the fact that the rubber has a variable spring rate, the rate on both the coil spring and rubber spring may in this manner be made approximately proportional to the load on the suspension.

It may be found preferable to so design the spring and the rubber that the rubber will take one-third of the torque load and the metal spring take two-thirds of the torque load although this ratio may be varied as may be found most desirable. At present, it seems preferable to have the rubber take about one-third of the torque load where a combined metal spring and rubber torsional spring is used.

Although more than one form of the invention has been illustrated and described in detail, it will be apparent to those skilled in the art that various modifications may be made without departing from the scope of the appended claims.

What is claimed is:

1. In a motor vehicle adapted to be driven by both its front and rear wheels, the combination of a longitudinally extending frame member having kick-up portions near its opposite ends; a driven wheel adapted to be supported at each of said kick-up portions of the frame; a wheel support for each wheel; and independent wheel suspension means for each wheel including a vertically extending frame member rigidly secured at its intermediate portion to said first mentioned frame member at the front of a kick-up portion, a pair of bearing sleeves rigidly carried at the upper and lower ends of said vertically extending frame member, said sleeves being disposed transversely with respect to said frame members, a pair of crank arms, each arm of a pair having a trunnion mounted in a bearing sleeve, and each of said pairs of said crank arms extending longitudinally of said frame and having means at their outer ends for pivotally connecting with the wheel support for permitting parallelogrammatic movement of the wheel, and a helical torsion spring around the outside of each sleeve, each spring being anchored at its one end with the vertically extending frame member and at the other end being connected to a corresponding crank arm.

2. In an individual wheel suspension, a vehicle frame member, an arm connected to the frame member, a supporting member having a tubular part, a pair of internally and externally threaded bushings disposed in axially spaced relation in the tubular part, the external threads of said bushings forming their own threads in the tubular part and normally holding the bushings and the tubular part against turning and against axial movement, while permitting adjustable inward turning of either bushing to compensate for wear and an externally threaded trunnion on the arm and threaded through both bushings.

3. An individual wheel suspension comprising a vehicle frame, a wheel, upper and lower arms extending longitudinally of the frame, means connecting one end of each arm to the wheel, means pivotally supporting the other end of each arm on the frame including tubular parts, externally threaded parallel trunnions, internally and externally threaded bushings and means for resiliently connecting the arms to the frame for resiliently supporting the latter on the wheel and including a rubber ring bonded to each of said tubular parts and a coil torsion spring, said spring encircling the rubber ring and said spring and ring encircling each tubular part and each trunnion, and said spring having its ends operatively connected respectively to the arms and frame so that downward movement of the frame applies torsion to the rubber and spring.

4. In a motor vehicle, the combination with a longitudinally extending side frame member, of an independent wheel suspension comprising transversely disposed bearing sleeves mounted in spaced vertical alignment above and below and rigid with said frame member, a pair of crank arms extending longitudinally of the frame having externally threaded trunnions at their inner ends mounted in said bearing sleeves and pins at their outer ends extending parallel to said trunnions, wear compensating means associated with said trunnions and said bearing sleeves, a wheel support including wear compensating pivot means engaging said crank pins, and torsion spring means about each of said bearing sleeves including a helical torsion spring and a rubber sleeve, said rubber sleeve being bonded to each of said bearing sleeves and being located within the helical spring and substantially in contact with the inner periphery thereof whereby a torsional winding of the spring applies torsion to said rubber sleeve.

5. In a motor vehicle, in combination a longitudinally extending side frame member, a vertically extending frame member rigidly secured at its intermediate portion to said first mentioned frame member, a wheel suspension comprising bearing sleeves rigidly carried transversely with respect to said vertically extending frame member at its upper and lower ends, said sleeves laterally overhanging said frame members, a pair of crank arms adapted to be connected with a wheel to support it for parallelogrammatic movement and having externally threaded trunnions extending into and being threadedly engaged within said sleeves on opposite sides of the frame member by means of wear compensating internally and externally threaded bushings, and a helical torsion spring around the outside of each sleeve and positioned between said frame members and a corresponding crank arm, each spring being anchored at its one end to the vertically extending frame member and at its other end being connected to the corresponding crank arm.

KARL K. PROBST.

REFERENCES CITED

The following references are of record in the file of this patent:

UNITED STATES PATENTS

| Number | Name | Date |
| --- | --- | --- |
| 1,956,877 | Prouty | May 1, 1934 |
| 2,043,152 | Cook | June 2, 1936 |
| 2,078,212 | Leighton | Apr. 20, 1937 |
| 2,099,312 | Parsche | Nov. 16, 1937 |
| 2,105,541 | Leighton | Jan. 18, 1938 |
| 2,158,028 | Burke | May 9, 1939 |
| 2,166,774 | Tjaarda | July 18, 1939 |
| 2,270,571 | Woolson et al. | Jan. 20, 1942 |
| 2,322,879 | Piron | June 29, 1943 |

FOREIGN PATENTS

| Number | Country | Date |
| --- | --- | --- |
| 439,688 | Great Britain | Dec. 12, 1935 |
| 636,972 | Germany | Oct. 20, 1936 |
| 772,052 | France | Aug. 6, 1934 |